United States Patent Office 3,457,947
Patented July 29, 1969

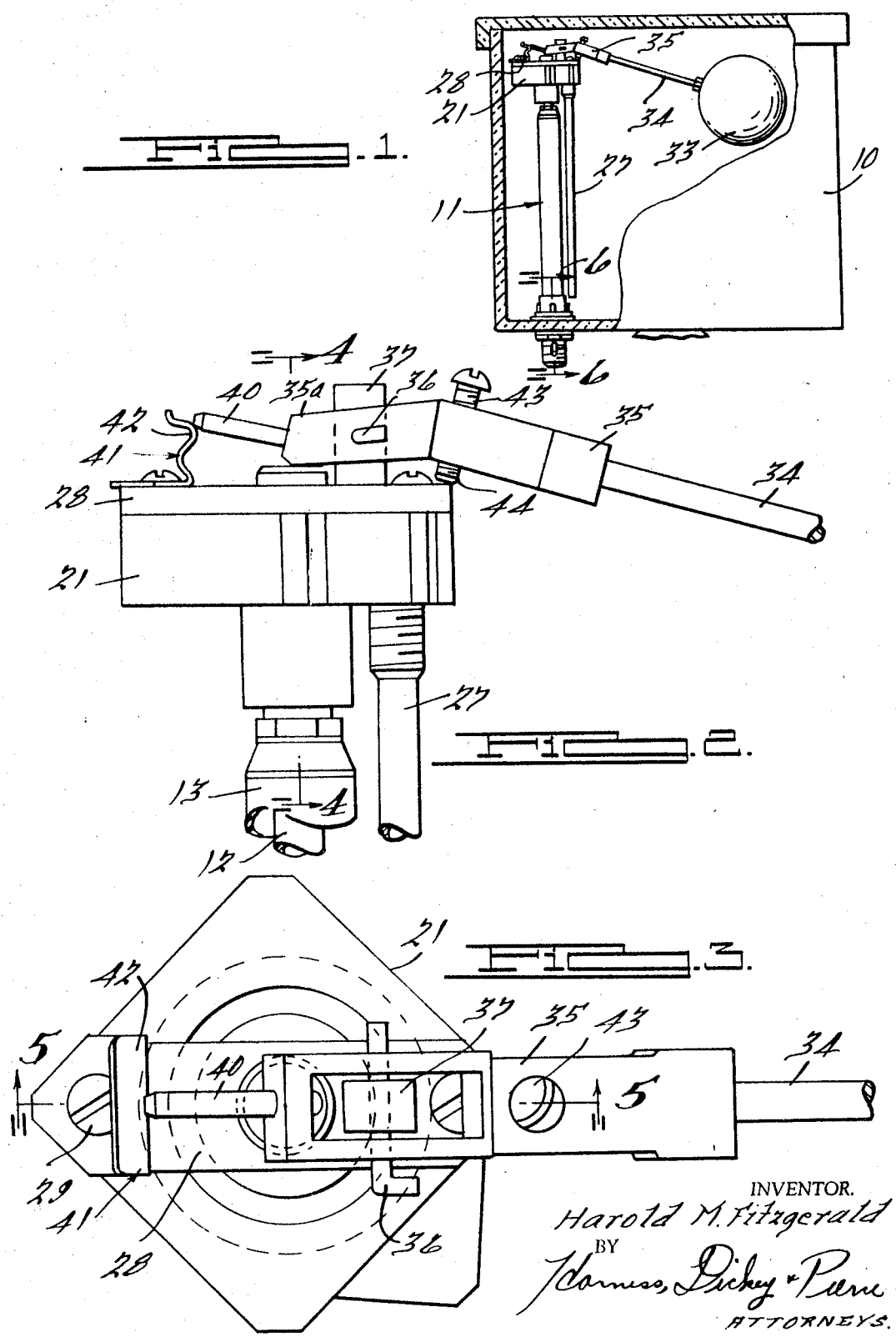

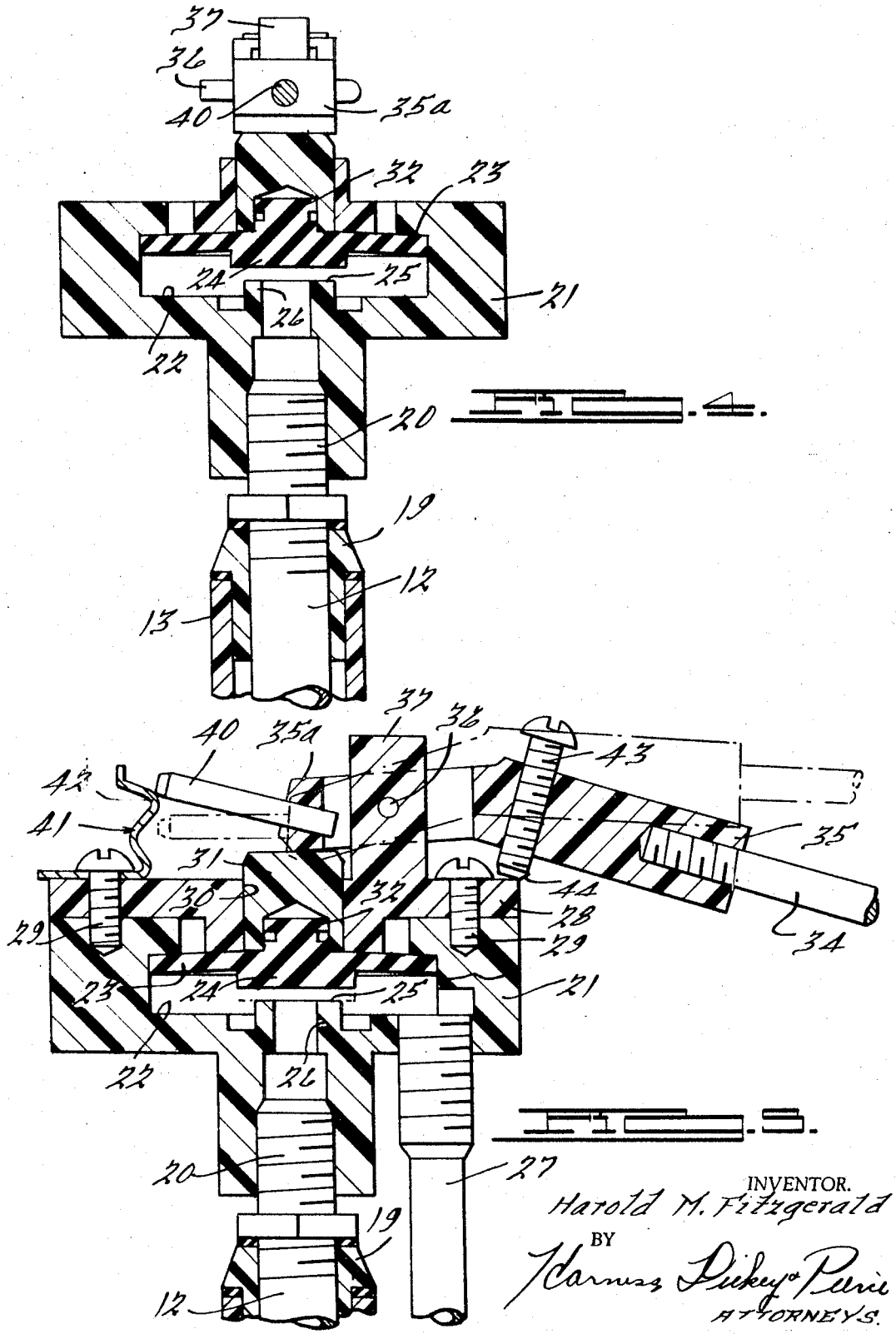

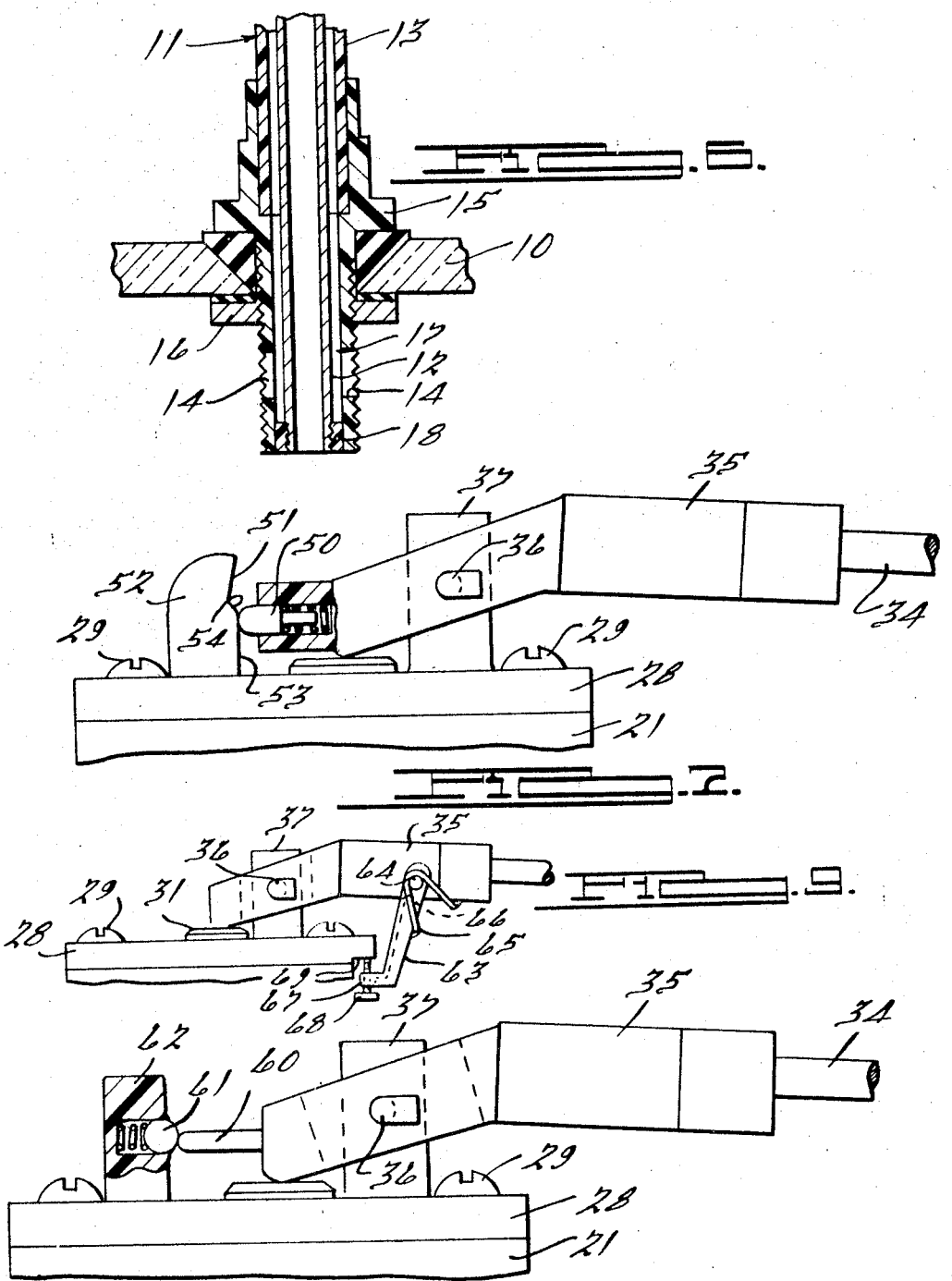

3,457,947
SNAP ACTION FILL VALVES FOR TOILETS
Harold M. Fitzgerald, Detroit, Mich., assignor to Fi-Jax Company, Detroit, Mich., a corporation of Michigan
Filed Oct. 19, 1965, Ser. No. 497,870
Int. Cl. F16k 1/36, 31/26, 27/02
U.S. Cl. 137—418                         1 Claim

ABSTRACT OF THE DISCLOSURE

The invention finds particular utility in connection with toilet valves actuated by the customary ball float and comprises spring means for restraining the final closing of the valve whereby the valve may be closed with a snap action when the water has reached the desired level in the tank.

---

Heretofore, in float controlled valves for toilets, the final closing of the valve was gradual and the period during which the valve was being finally closed occupied an appreciable length of time. During this closing period, the force of the water escaping past the closing valve caused objectionable noise for a relatively long time. It is an object of this invention to provide a valve in which this objectionable noise is eliminated.

Another object of this invention is to provide a device of this type which is so reduced in the number and character of its component parts as to approach the ultimate in structural simplicity to thereby create an economy in its manufacture, installation and maintenance costs.

The various objects and advantages, and the novel details of construction of several commercially practical embodiments of the invention, will become more apparent as this description proceeds, especially when considered in connection with the accompanying drawings, in which:

FIG. 1 is a view of a toilet water tank with the valve of this invention associated therewith;

FIG. 2 is an enlarged fragmentary elevational view of the valve means;

FIG. 3 is a top plan view of the valve shown in FIG. 2;

FIG. 4 is a vertical sectional view taken substantially on the plane indicated by line 4—4 in FIG. 2;

FIG. 5 is a vertical sectional view taken substantially on the plane indicated by line 5—5 in FIG. 3;

FIG. 6 is a detail sectional view taken on line 6—6 in FIG. 1;

FIG. 7 is a fragmentary elevational view of a modified form of construction;

FIG. 8 is a simliar view of another modified form of construction, and

FIG. 9 is a view of structure similar to that of FIG. 8, showing a function form of the invention.

Referring now to the drawings, the reference character 10 indicates a water tank for a toilet and 11 indicates generally the water supply pipe which extends through the bottom wall of the tank 10 for a connection with the main water supply pipe (not shown).

As shown in FIGURE 6, water is delivered to the tank through a water supply pipe 12 which is enclosed by a spaced antisyphon tube 13. The water supply pipe 12 extends through a fitting 15 which is secured to the wall of the tank 10 by means of a nut 16 threaded onto the exposed end of the fitting 15. The exposed end of the fitting is provided with outlets 14. If the water supply pipe 12 becomes ruptured, the water will flow into the antisyphon tube 13 and out of the apertures 14 so that it will become immediately apparent that there is a leak in the water supply pipe 12. The space 17 between the water supply pipe 12 and the fitting is closed at the bottom by a ring-like plug 18 and the space at the top end is closed by a sleeve-like plug 19.

The water supply pipe 12 extends beyond the sleeve-like plug or fitting 19, as indicated at 20. This end of the pipe 12 is threaded to receive a valve housing member 21. The valve housing member 21 is provided with a chamber or recess 22 adapted to receive a valve member 23. This valve member 23 is flexible and is adapted to be flexed from the open position shown in full lines in FIGURE 5 to the closed position shown in dotted lines in this figure. When in the closed position, the thickened portion 24 of the valve seats on the face 25 of the annular portion 26 of the housing member 21. When this valve is open, water from the supply pipe 12 may flow through the chamber 22, out the outlet pipe 27 and into the tank 10.

Secured to the housing 21 is a strap-like member 28 which is secured thereto by screws or the like 29. This member 28 is provided with a central aperture 30 to slidably receive a plunger-like member 31. The inner end of this plunger member 31 engages a plug-like extension 32 on the valve member 23. When the plunger member 31 is depressed, the valve 23 will move from the full line position shown in FIGURE 5 to the dotted line position to seat on the valve seat 25 and cut off the supply of water through the water supply pipe 12.

The reference character 33 (FIGURE 1) indicates the usual float member which is connected by a rod 34 to a fitting or end member 35. This fitting or end member 35 is pivotally supported as at 36 on a stud-like member 37 which extends upwardly from the strap-like member 28. The end 35a of the fitting 35 extends beyond the pivot 36 and engages the plunger member 31 so that when the float 33 rises, the plunger member 31 will be depressed and actuate the valve member 23 to move it to the dotted line position in which it cuts off the supply of water from the water supply pipe 12. This position of these parts is shown by dotted lines in FIGURE 5.

It is an object of this invention to restrain the final closing of the valve whereby the valve may be closed with a snap action when the water has reached the desired level in the tank. To accomplish this, the end 35a of the fitting 35 is provided with a pin-like extension 40 adapted to engage a resilient latch member 41 provided with a laterally offset portion 42. Adjustably mounted in the fitting 35 is a set screw 43, the end 44 of which engages the adjacent portion of the strap-like member 28. This limits the downward movement of the float 33 in the tank 10. This position of the parts is illustrated in full lines in FIGURE 5.

While the tank 10 is being filled, the float 33 is held in the position illustrated in FIGURE 1 by the engagement of the set screw 43 with the strap-like member 28 of the housing member 21. As the water level rises, the float 33 is moved upwardly, but the end of this upward movement of the float 33 is restrained by the engagement of the pin 40 with the portion 42 of the resilient latch member 41. When the water in the tank 10 has reached the desired level, the force of this water on the float 33 will move the pin 40 past the laterally offset portion 42 of the resilient latch member 41 with a snap action, whereupon the float 33 rises to a position on top of the water and moves the parts of the valve to the position shown in dotted lines in FIGURE 5. In other words, the fitting member 35 is moved so that the end 35a thereof engages the plunger member 31 and depresses the same and thus moves the portion 24 of the flexible valve member 23 into engagement with the valve seat 25 to cut off the supply of water to the tank. When the tank is emptied, the weight of the float 33 and the fitting 35 will cause these parts to assume the full line position shown in FIGURE 5 wherein the extension or pin 40 is again moved to the top side of the laterally offset portion 42 of the resilient latch 41.

FIGURE 7 shows a modification in which the resilient latch 41 is replaced by a spring-pressed plunger 50 carried by the fitting 35. This spring-pressed plunger engages the surface 51 of a cam member 52 when the float 33 is in its downward position and engages a surface 53 when the float is in the upward position. These two surfaces are connected by a shoulder or cam portion 54. Thus, when the float 33 is in its downward position, the plunger 50 will engage the surface 51 and when the float moves to its upward position, the plunger 50 will engage the surface 53.

In FIGURE 8, another modification of the invention is illustrated in which the member 35 is provided with a fixed pin 60 which engages a ball detent 61 resiliently mounted in an upright member 62. In this construction, the float 33 is held in its lower position shown in FIGURE 1 until the desired water level has been reached whereupon the pin 60 will depress the ball 61 and move to the position shown in FIGURE 8.

In FIGURE 9, the member 35 has a link 63 secured by a pivot 64 thereto. A spring 65 urges the link in a clockwise direction until a shoulder 66 thereof strikes the bottom face of the member 35. The bottom of the link 63 has a projection 67 containing a screw 68 the end of which engages the face 69 of the member 28 when the member 35 is moved upwardly by the flow of water into the tank. The screw 68, acting as an abutment means and a latch, will stop the upward movement of the member 35 as the flow of water continues. When sufficient pressure is built up on the member 35, the screw 68 will slide from the face 69 permitting the member to activate the valve plunger 31 and shut off the flow of water instantly with a snap action.

In all three forms of construction, means is provided for restraining the final closing of the valve whereby the valve may be closed with a snap action when the water has reached the desired level in the tank. Thus, the objectionable decreasing surging noise present when ordinary toilet valves are used is eliminated.

What is claimed is:

1. In a valve device of the class described, a housing connectable to the outlet end of a water supply pipe, a valve member in said housing for controlling the flow of water from said supply pipe, a float actuated element, means connecting said float actuated element to said housing for actuating said valve member, an axial extension on the end of said float actuated element, and resilient abutment means on said housing in the path of movement of said axial extension which is restrained thereby to both close and open the valve member with a snap action by the direct application of the pressure on the float actuated element by the change in height of the water on which the float of the actuated element rests.

References Cited

UNITED STATES PATENTS

| | | | |
|---|---|---|---|
| 1,558,178 | 10/1925 | Jung | 137—416 |
| 2,706,998 | 4/1955 | Bletcher et al. | 137—592 X |
| 2,745,427 | 5/1956 | Hjulian | 137—420 |
| 2,875,977 | 3/1959 | Stone et al. | 137—451 X |
| 3,165,120 | 1/1965 | Horowitz | 251—297 X |

WILLIAM F. O'DEA, Primary Examiner

D. R. MATTHEWS, Assistant Examiner

U.S. Cl. X.R.

137—424, 435, 444, 451, 592; 251—297